Figure 1:
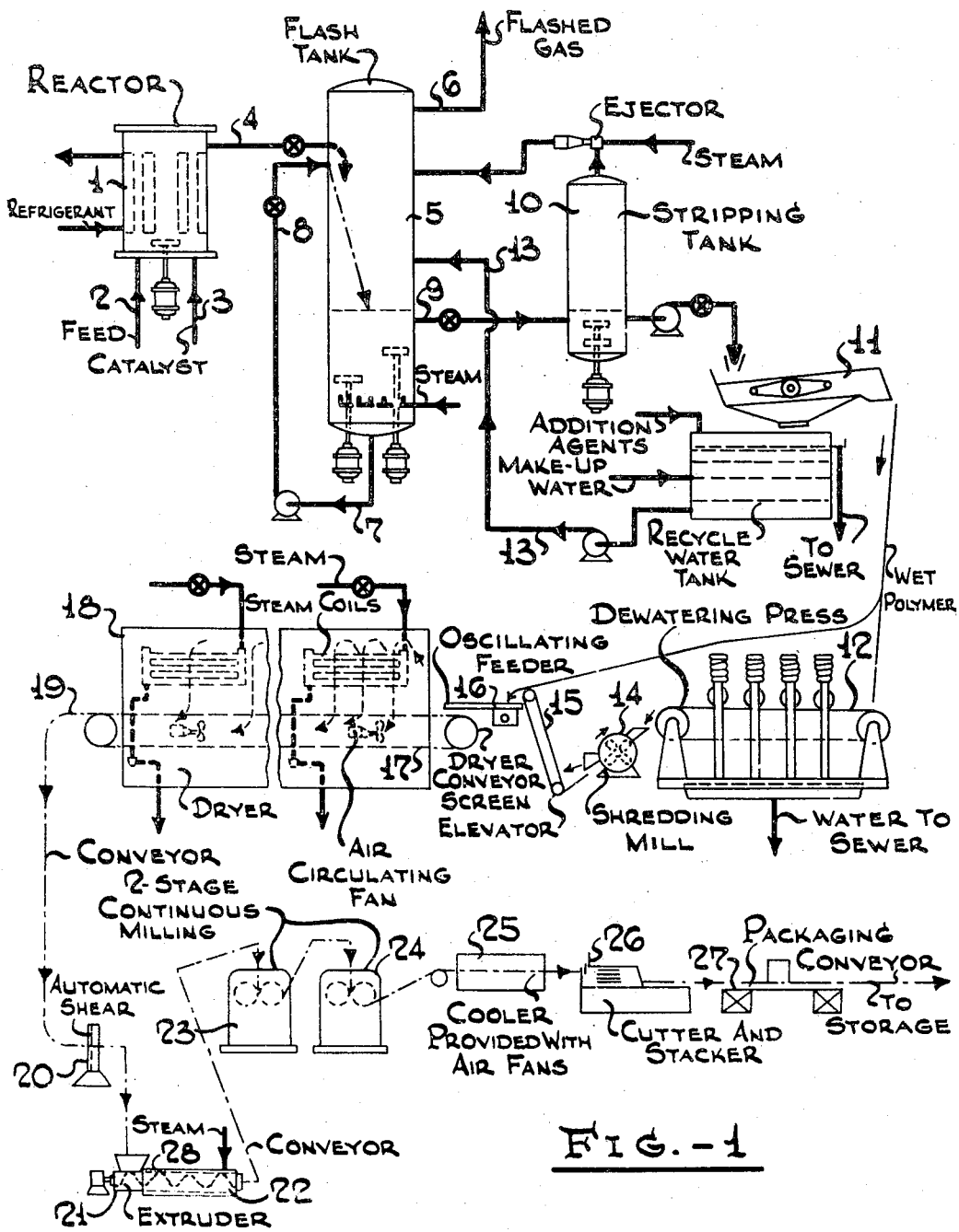

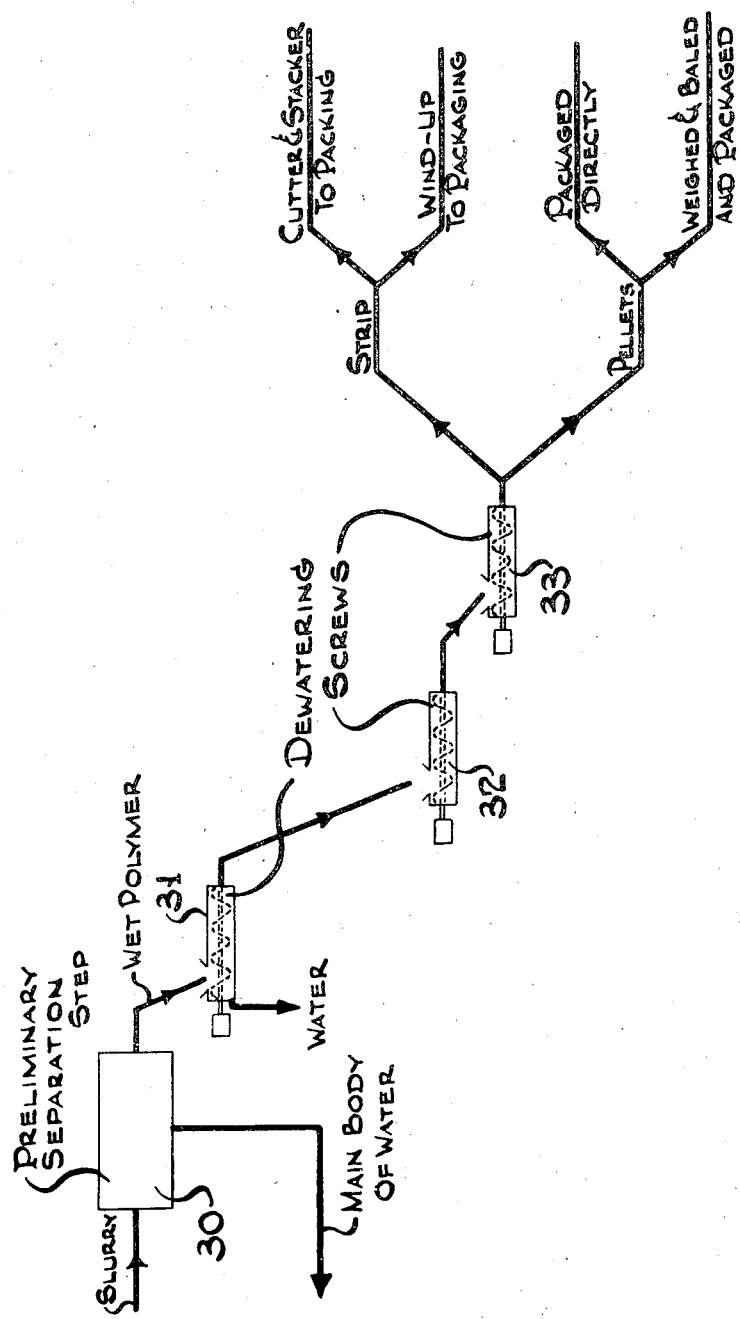

Patented May 31, 1949

2,472,037

UNITED STATES PATENT OFFICE 2,472,037

METHOD FOR FINISHING POLYMERS

Walter A. Wurth, Cranford, and Stanley C. Lane, Roselle, N. J., assignors to Standard Oil Development Company, a corporation of Delaware Application January 16, 1946, Serial No. 641,611

4 Claims. (Cl. 260—93)

This invention relates to polymerization processes and apparatus and particularly to processes and apparatus for the low temperature polymerization of isoolefins or mixtures of isoolefins and diolefins.

It has been known for some time that high molecular weight polymers, i. e., having a molecular weight of from about 15,000–25,000 up to 300,000 or more (as determined by the Staudinger method) are obtained if isoolefins, such as isobutylene, are contacted with Friedel-Crafts type catalyst such as aluminum chloride and the like at temperatures below about −10° C. (See, for example, Mueller-Cunradi U. S. Patent No. 2,203,873, issued June 11, 1940.) More recently it was found that a copolymer which is curable with sulfur is obtained if a mixture of about 70 to 99.5 weight percent of an isoolefin such as isobutylene with about 30 to 0.5 weight percent of a conjugated diolefin having 4 to 5 carbon atoms such at butadiene or isoprene is treated with a solution of a Friedel-Crafts type catalyst such as aluminum chloride in a non-complex forming low freezing solvent such as methyl or ethyl chloride and at temperatures of between −10° C. and −160° C., preferably between −40° C. and −103° C. (See, for example, Australian Patent No. 112.875, issued July 31, 1941.) These polymerizations have been conducted in the presence of either an internal refrigerant such as liquefied ethylene, in which case the heat of reaction is removed directly by evaporation of part of the ethylene without the necessity for transferring heat through the surfaces of the reaction vessels or through cooling coils arranged in the reaction vessels, or in the presence of an external refrigerant whereby the heat of reaction is removed by heat exchange through the walls of the reaction vessel. Consequently, the reaction is now carried out in such a manner as to keep the solid polymer particles in a finely divided condition suspended in the cold reaction mixture so that a slurry of solid polymer particles in the cold reaction mixture is obtained which can be handled at low temperature. In view of the inflammable nature of certain of the reactants the slurry is discharged into a well-agitated body of a liquid flashing medium, such as water, in which the polymer is suitably insoluble and which is maintained at a temperature well above the boiling point of the majority of the volatile materials accompanying the polymer to form a slurry of finely divided polymer particles in the warm flashing liquid. This slurry is then stripped of any residual volatile materials, the polymer is separated from the main body of the liquid, as for example by decantation or filtration, and is dried while being carried through a tunnel on a screen or an sections of a perforated plate in the presence of warm air. These processing steps are preferably arranged so that the successive operations are carried out in a continuous manner.

However, difficulty has been encountered in obtaining a suitably dry polymer in this manner. The bed of polymer particles on the dryer conveyor belt tends to flow sufficiently to form an impermeable mat at the usual dryer temperatures of 225–325° F. before the desired dryness is reached, particularly when low molecular weight polymers are being processed. When this occurs the air flow through the dryer is hindered to such an extent that satisfactory dryness of the polymer is difficult to procure during normal residence period in the dryer. If, on the other hand, an attempt is made to prevent such matting of the polymer the temperature must be lowered, or the residence time shortened, to a point resulting usually in incomplete drying within the tunnel dryer. In any case, the moisture content, porosity, and low temperature of the polymer discharging from the dryer interfere with the proper operation of the subsequent milling step which is usually employed to deliver the polymer in a suitable condition of dryness and compactness for packaging and sale. For commercial use it is usually required that polymers of this type be dried to a moisture content below 0.5%, and it is preferable to reduce this to 0.1 or 0.2%, or even lower.

It is, therefore, the principal object of this invention to provide a method of drying polymers which will permit more complete removal of water from the polymer and more efficient operation of any subsequent milling step. It is a further object of this invention to provide a method, in a continuous operation, for increasing the amount of mastication of the polymer to assure complete removal of any absorbed or occluded volatile impurities and to provide ready means of employing plasticizing agents, at the same time increasing the temperature of the polymer to facilitate the subsequent milling and handling steps and to insure the procurement of proper product quality. It is a further object to increase the productive capacity of the tunnel dryer and the mills, where such equipment is employed, by permitting them to operate under more favorable conditions than would otherwise be required.

These and other objectives of this invention are accomplished by continuously subjecting the wet polymer, after separating it from the main body of the water, to a simultaneous dewatering, compacting, and extruding action at an elevated temperature between 150 and 450° F., preferably 250 to 375° F. These simultaneous actions are best accomplished in an enclosed screw extrusion machine which discharges polymer at approximately the proper temperature for milling. In one embodiment of this process the water content of the polymer is first reduced to a small amount by passage through the usual tunnel dryer. Final drying is then obtained by use of the screw machine. In a second embodiment of this process, substantially all of the water remaining in the polymer after the preliminary filtering step may be removed by one or more screw machines without use of a tunnel drier. In any case, it is the principal feature of this invention to subject the polymer to a series of continuous operations, culminating in the screw from which the polymer is discharged essentially free of water and at a temperature particularly suited for the milling operation.

The accompanying diagrams illustrate preferred methods for practicing the process of this invention. Figure 1 is a diagrammatic representation of a complete unit embodying the principles of this disclosure. Figure 2 portrays alternative methods of removing water from the polymer. It is to be understood that numerous other methods may be employed in accordance with this invention and those skilled in the art will readily perceive modes of applying the terms of this disclosure to their specific problems. The complete description of the invention, which follows, will be made in connection with Figure 1 in order to achieve greater simplicity of disclosure.

Referring, therefore, to Figure 1, there is shown a reactor 1 wherein issoolefinic materials and preferably mixtures of isoolefinic and diolefinic materials alone or together with a diluent supplied through feed inlet 2 are reacted at low temperatures, preferably around −140° F. by the addition of a Friedel-Crafts catalyst supplied through line 3. The polymer formed as a slurry of fine solid polymer particles suspended in cold reaction medium comprising unreacted hydrocarbons, diluents, catalyst and catalyst solvent as well as impurities is withdrawn from the reactor through line 4 and is discharged into flash tank 5 containing a liquid, such as water, inert to the polymer and maintained at a temperature of about 150° F. wherein the volatile materials associated with the polymer are flashed into vapor. The flashed gases are withdrawn from the flash tank through line 6 and are passed to suitable purification and recovery means for reconditioning the flashed materials for reuse in the process.

The water or other liquid flashing medium is heated as by the introduction of steam thereinto and vigorously agitated by means of suitable stirrers or the like to keep the polymer suspended as a uniform slurry in the flashing liquid. Flashing medium may also be withdrawn from the flash tank through line 7 and pumped back into the flash tank as at 8 in such a manner as to impinge against the polymer stream entering the flash tank thereby breaking it up in order to prevent agglomeration of the polymer into relatively large masses which might plug the water slurry system and which might contain excessive amounts of trapped volatile liquid.

The polymer is withdrawn from the flash tank through line 9 as a slurry of finely divided solid particles suspended in the warm flashing liquid and is discharged into the stripping tank 10. The treatment of the polymer as a slurry in the warm fluid, if necessary with injection of stripping vapors such as steam, is carried out to such a degree that nearly all the highly volatile materials originally absorbed in or adsorbed on the polymer and dissolved in the liquid are removed. A preferred type of operation is one in which the volatiles are removed in two zones, the first, as in flash tank 5 at atmospheric or slightly above atmospheric pressure and the other as in stripping tank 10 at below atmospheric pressure. Preferably, the water in the stripper 10 is boiling, due to use of vacuum. The flow of water is usually so large that steam does not have to be added to the stripper when the water enters hot enough.

The slurry of finely divided polymer in warm flashing liquid, desirably water, is passed from the stripping tank 10 to a decantation or filtration means such as, for example, a vibrating screen 11 wherein it is separated from the greater part of the suspending liquid. The separated polymer which may carry with it up to 2 or 3 pounds, or even more, of water per pound of dry polymer may be discharged into a dewatering press 12 of the endless screen type or rotary screen type, wherein it may be passed between pressure rollers which squeeze out further amounts of water or suspending liquid. The water or the like passing through the vibrating screen is desirably collected and make-up liquid and desired addition agents, such as alkalies for reducing acidity caused by decomposition of the catalyst, stabilizing agents for the polymer, zinc stearate or other dispersing agents, etc., are added, whereupon the liquid is recycled to the flash tank through line 13. In the event of the inlusion of a dewatering press, the liquid removed in the press 12 may be discharged to the sewer or recovered in suitable fashion.

In the event that the pressing operation has agglomerated the particles, the polymer may then be discharged into a suitable disintegrating means such as a hammer mill 14 in order to reduce the size of the polymer particles preparatory to discharge into the dryer system. The polymer particles discharged from the hammer mill are conveyed by suitable means such as an elevator 15 to feeder 16 which serves to distribute the polymer on the conveyor screen 17 passing through the dryer 18. The polymer frequently does not require pressing in preparation for the drying step, in which case the particles leaving the filtering means 11 are conducted directly to the dryer feed means 15 or 16.

The polymer from which the major quantity of water has been removed as by filtering is treated in the dryer 18 under conditions to remove all but a small amount of the residual adhering or occluded fluid, usually water, and most of the impurities of relatively low volatility carried through with the polymer from the reaction zone. By operating the dryer so that about 0.5 to 5%, preferably 0.5 to 2%, moisture still remains in the polymer, the polymer is not subjected to high temperatures for a sufficient time to cause it to flow into and plug the openings of the dryer conveyor screen or to degrade the physical properties of the polymer. Ultimate removal of these last traces of water and impurities is essential since small amounts thereof tend to cause blistering during curing of the polymer. This ultimate removal is more readily accomplished by hot mastication than by hot air treatment.

The dryer used may be a continuous conveyor dryer, the polymer being carried through a tunnel on a screen or on sections of perforated plate although other types of continuous or semi-continuous dryers may be used. The dryer is preferably of a tunnel, continuous conveyor, through-flow type of either one or more passes, wherein a considerable flow of air is recirculated over steam coils or other heating elements and through or against the bed of polymer material slowly moving through the dryer on a perforated conveyor belt or screen. The preferred drying temperature is dependent upon the molecular weight of the polymer being handled and the time of exposure to the drying temperature.

If desired, any tendency for the polymer to stick to the drier surfaces may be avoided by applying a coating to these surfaces, such as zinc oxide, zinc stearate, etc. From the dryer the polymer is passed by conveying means 19 to screw 21 for final moisture removal coincident with product quality improvement and temperature increase. In case the material discharged from the dryer is in the form of a blanket, a large automatic shear 20 or other suitable means may be provided to cut it into small, easily handled pieces. Screw machine 21 may be a conventional extruder or any type of enclosed screw capable of forcing the polymer through a pressure zone such as would be formed by a restriction in the barrel or discharge head. A drain hole or other means may be employed for eliminating any liquid which may collect in the feed hopper at times when the moisture content of the polymer input is relatively high. The screw is also provided with a steam jacket 22 to prevent loss of heat from the polymer and to assist in the action of increasing the temperature of the polymer so that its physical condition is suitable for proper handling by the succeeding continuous milling stage. From the screw 21 the ploymer passes into continuous mills 23 and 24 at a temperature suitable for working. The sheeted polymer is passed from the mill to a suitable cooler 25 wherein it is cooled to about 160° F. or below and preferably to about room temperature, from which it is passed to a packaging operation employing for example a cutting and stacking machine 26 and placed in suitable containers as at 27. Without the proper conditioning of the polymer, the continuous milling operation shown in Figure 1 is difficult, and at times impossible to carry out expeditiously without excessive manual handling or without introducing an unreasonably large number of milling machines. This arises partly from the peculiar combination of plastic and elastic properties of these polymers which prevent formation of a continuous band, or thin sheet, of polymer on the mill roll under certain conditions. Without formation of such a band on the mill roll, the polymer cannot be removed in the continuous strip form desired for subsequent handling. Rather, it will fall from the mill rolls either in crumbly form or as an uneven mass, requiring further mastication. In such case, considerable operating attention, manual handling, or additional processing would be required to permit the continuity of operations desired. Without formation of a continuous band on the mill roll, the milling machine therefore becomes an inefficient agent for masticating the polymer and accomplishing the removal of the final moisture which remains in the polymer after the dryer operation as hereinbefore described. The conditions which tend to prevent the formation of this continuous band on the mill roll are low temperature, presence of moisture, and excessive porosity of the polymer fed to the mill. The limiting conditions depend upon the molecular weight and other properties of the polymer but, in general, polymers with temperatures below 250 to 300° F. and moisture contents greater than 0.5%, and in the form of a porous mat or crumbs as normally discharged from the dryer, do not readily band when fed continuously to the mill. Polymers having physical properties, such as high molecular weight, which facilitate tunnel drying, are usually more difficult to sheet on the mill, and conversely, those which band at moderate mill temperatures usually tend to soften and dry incompletely in the tunnel dryer. As pointed out hereinbefore, it is inconvenient to operate the dryer under conditions which can be relied upon to meet these feed requirements for the mill in continuous operation. Therefore, a major advantage for operating in accordance with the invention described herein is that both the dryer and the mill can be operated under the preferred conditions. This is made possible by use of the screw machine which serves the purpose of simultaneously completing the drying, raising the temperature and compacting the polymer from the dryer en route to the mill.

In contrast to the feed conditions required for the mill, the screw machine can handle cool, moist and porous feeds without critical temperature limitations. In forcing the polymer through a pressure zone, not only are pockets of moisture, air or gas squeezed out and the polymer consequently dewatered and compacted, but also the work expended in driving the screw is largely converted into heat. By proper jacketing of the extruder cylinder, this heat is retained within the polymer rather than being dissipated. This permits the compacted polymer to be discharged at the high temperature desired for flashing off substantially all of the residual moisture or other volatile impurities and assures ready banding on the mill. The extent of temperature rise is largely dependent upon the amount of work input which may be controlled by the extent that the polymer flow through the machine is restricted. The required restriction can be obtained in various ways, as for example, the use of suitable die plates at the point of discharge.

It is often desirable to make further provision against deterioration in storage by adding a suitable antioxidant to the polymer at a convenient point in the finishing operation. The presence of such a stabilizer is an insurance against slow deterioration in storage which can be catalyzed by minute traces of impurities, which may at times be introduced in the process in spite of all ordinary precautions. The presence of this stabilizer is desirable in some cases in compounding the product for its ultimate use. Furthermore, under certain conditions, agents which may be added in the water slurry step either as slurrying aids (viz. as protective agents to coat the slurry particles and prevent agglomeration of the polymer in any stagnant portions of the slurry system and/or coalescence in the dryer) or as agents added to control the pH of the polymer slurry (as may be necessitated by the continual formation of small traces of acids from the catalyst removed from the polymer) may in themselves accelerate storage deterioration. It is often particularly desirable and convenient to add an antioxidant such as phenylbetanaphthylamine, isopropyl, diphenylamine, hydroquinone, dibenzyl ether, etc., to the water slurry, as a solution, emulsion, or slurry.

It is possible, as in the prior art, to incorporate such agents in the polymer by adding them to the slurry, followed by passage of the polymer through the dryer and through a simple compressing or sheeting operation. However, in adding small quantities of such agents to a mass of polymer, there is usually required a period of mastication to effect a suitably uniform dispersion. Herein lies an added advantage of the invention which provides such mastication continuously in the course of carrying out the final drying operation. This advantage is of particular importance when adding another type of agent, namely, a chemical plasticizer such as an aryl mercaptan, as already disclosed in Serial No. 590,842, filed April 26, 1945, now U. S. Patent 2,466,300.

Such an agent requires not only uniform dispersion, as with other agents, but further requires considerable mastication to accomplish the desired reduction in average molecular weight and viscosity of the polymer. The amount of milling normally provided for continuously sheeting the product is usually inadequate to complete the chemical plasticizing action, but it has been found that the desired effect can be obtained simultaneously with the final dewatering, heating and compacting actions if the polymer containing the plasticizing agent is subjected to the extrusion step of this invention. This effect is desirable even if the polymer is of such type that the tunnel-type dryer is effective in removing substantially all the water. Thus it is advantageous to subject a polymer which has had its moisture content reduced in the dryer to 0.5% or below to a further compacting and extruding action in a screw in order to prepare it for subsequent milling.

Figure 2, illustrates a portion of the equipment utilizing an alternative method of removing the water from the polymer slurry and preparing it for packaging. Referring to the embodiment of Figure 2 a slurry of finely divided polymer in warm water from the stripping tank is passed to an initial slurry-separation step 30 where the wet polymer is separated from the main body of water. This initial step may be a vibrating screen as shown in Figure 1, a gravity separation device, decanter, filter, press, or any desired combination of these.

The wet stock from the screen is then discharged into a screw machine or a series of screw machines, the number depending upon the moisture retaining qualities of the polymer being processed and the relationship between the desired throughput and the maximum polymer-handling capacity of the size of screw employed. In general, for a given throughput of polymer, the larger the screw machine employed the smaller the number of screw machines required in series. For the sake of illustration, a series of three screw machines is shown, but any desired number may be used. While the principles for moisture removal in the successive dewatering screws are similar, differences in the mechanical features of design are desirable dependent upon the range of moisture content being handled. For instance, the conventional screw machine shown as 21 on Figure 1 could normally be expected to handle continuously, and at satisfactory rate, polymers of the aforementioned description with occluded moisture contents ranging up to 2 or 3%, or even more, depending upon the operating conditions employed. With higher ranges of moisture content, the tendency for reduction in polymer handling capacity of a machine due to the lubricating effect of the liquid can be counteracted by modifying such mechanical design features as the pitch of the screw flights, clearance between the screw and the barrel lining, or by corrugation of the surfaces of the screw and/or the barrel lining or by shortening the barrel coincident with increasing the diameter of the barrel. The handling of high moisture-containing polymers is also facilitated by the introduction of a space within the barrel located to the rear of the feed opening, with this rear portion of the screw equipped preferably with blade flights of closer pitch than obtains for the screw blades in front of the feed opening, and also equipped with a drain located in the furthest rear point of the space so allotted behind the feed to serve as a means for the continuous draining of water removed from the polymer by the compacting effort of the screw in the fore part of the machine. It is obvious that the entire dewatering may be continuously accomplished by means of a single screw machine designed for the throughput desired and the moisture content of the polymer handled and operated to discharge the polymer dry at an elevated temperature as described for Figure 1. In any case, however, all the screws should be equipped with steam jackets so that application of heat may be employed when desired.

As shown in Figure 2, polymer from the initial dewatering step 30 which may contain up to 2 or 3 pounds of water per pound of dry polymer, is fed into the first screw machine 31, operated for handling high moisture containing polymers, and is discharged with a moisture content usually running below 10–20%. Thence, the polymer is fed into a second screw machine 32, which may be similar to either 31 or 33, followed in turn by a screw machine 33, similar to 21 in Figure 1, for completion of drying and processing. A suitable die is used to deliver the dry polymer in the strip or pellet form desired for packaging. However, it is within the scope of this invention to include a mill after the screw or screws 31 to 33 as illustrated in Figure 1. In this embodiment of the invention the entire series of operations following the slurry separation are accomplished in one or more screws, eliminating the other types of dewatering equipment, presses, driers, shredding devices, and if desired, the mills.

The nature and objects of the present invention having been thus described and illustrated, what is claimed as new and useful and is desired to be secured by Letters Patent is:

1. In a process for finishing solid, high molecular weight rubbery polymers prepared from isobutylene at temperatures between —40° C. and —160° C. in the presence of a Friedel-Crafts catalyst, in which process the cold polymer product and associated low boiling materials including unreacted monomer and diluents are discharged into a heated liquid medium in order to flash off said associated low boiling materials and to form a slurry of polymer particles in said liquid medium; the improvement which comprises separating wet polymer particles from said liquid medium, and subjecting the separated polymer particles to screw extrusion through an extrusion zone maintained at a temperature between 150 and 450° F. whereby the polymer is essentially freed of residual liquid and simultaneously compacted.

2. In a process for finishing solid, high molecular weight rubbery polymers prepared by copolymerization of 70 to 99.5 weight percent of isobutylene and 30 to 0.5 weight percent of a conjugated diolefin having 4 to 5 carbon atoms at a temperature between −40° C. and −160° C. in the presence of a Friedel-Crafts catalyst in which the cold polymer and associated low boiling materials including unreacted monomer and diluents are discharged into a body of heated aqueous liquid in order to flash off the said associated low boiling materials and to form a slurry of polymer particles in said aqueous liquid, and from which liquid the polymer particles are thereafter separated in a wet state; the improvement which comprises screw extruding the separated polymer particles through an extrusion zone maintained at a temperature between 250 and 375° F. whereby the polymer is essentialy freed of water and simultaneously compacted.

3. In a process for finishing solid, high molecular weight rubbery polymers prepared by copolymerization of 70 to 99.5 weight percent of isobutylene and 30 to 0.5 weight percent of isoprene at a temperature between −40° C. and −160° C. in the presence of a Friedel-Crafts catalyst in which the cold polymer and associated low boiling materials including unreacted monomer and diluents are discharged into heated water in order to flash off said associated low boiling materials and to form a slurry of polymer particles in water, the improvement which comprises screening the polymer particles from the water slurry, passing the resulting wet polymer particles through a pre-drying zone through which hot air is circulated to remove all but 0.5 to 5 percent of the water from the polymer, passing the pre-dried particles to an extrusion zone maintained at a temperature between 250 and 375° F. and screw extruding the polymer particles through the said extrusion zone whereby the liquid content of the polymer is reduced below 0.2 percent and the polymer is simultaneously compacted.

4. In a process for finishing solid, high molecular weight rubbery polymers prepared by copolymerization of 70 to 99.5 weight percent of isobutylene and 30 to 0.5 weight percent of isoprene at a temperature between −40° C. and −160° C. in the presence of a Friedel-Crafts catalyst in which the cold polymer and associated low boiling materials including unreacted monomer and diluents are discharged into heated water in order to flash off said associated low boiling materials and to form a slurry of polymer particles in water, the improvement which comprises screening the polymer particles from the water slurry, passing the resulting polymer particles containing up to 3 pounds of water per 1 pound of polymer directly from the filtration step to a series of screw extrusion zones, extruding the polymer particles through said series of extrusion zones wherein the polymer is maintained at a temperature between 150 and 375° F. while being simultaneously de-watered and compacted, draining water from the first of said extrusion zones and withdrawing compacted polymer having a water content below 0.2 percent from the last of said extrusion zones.

WALTER A. WURTH.
STANLEY C. LANE.

REFERENCES CITED

The following references are of record in the file of this patent:

UNITED STATES PATENTS

| Number | Name | Date |
|---|---|---|
| 2,371,722 | Wanderer | Mar. 20, 1945 |
| 2,401,754 | Green | June 11, 1946 |